US010424981B2

(12) United States Patent
Kusase

(10) Patent No.: US 10,424,981 B2
(45) Date of Patent: Sep. 24, 2019

(54) ROTATING ELECTRIC MACHINE WITH MAGNETIC GAPS

(71) Applicant: DENSO CORPORATION, Kariya, Aichi-pref. (JP)

(72) Inventor: Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 15/421,932

(22) Filed: Feb. 1, 2017

(65) Prior Publication Data

US 2017/0222504 A1    Aug. 3, 2017

(30) Foreign Application Priority Data

Feb. 2, 2016  (JP) ................................. 2016-018025

(51) Int. Cl.
*H02K 1/27* (2006.01)
*H02K 1/24* (2006.01)
(Continued)

(52) U.S. Cl.
CPC ............... *H02K 1/24* (2013.01); *H02K 1/146* (2013.01); *H02K 1/2706* (2013.01);
(Continued)

(58) Field of Classification Search
CPC ........ H02K 1/2773; H02K 1/24; H02K 1/146; H02K 1/2706; H02K 1/2746; H02K 1/246;
(Continued)

(56) References Cited

U.S. PATENT DOCUMENTS 3,979,821 A * 9/1976 Noodleman ......... H02K 13/006
310/156.53
2004/0212266 A1* 10/2004 Hans .................... H02K 1/2766
310/156.56
(Continued)

FOREIGN PATENT DOCUMENTS

JP    2002-218683 A    8/2002
JP    2002218683 A  *  8/2002  ............... H02K 1/27
(Continued)

OTHER PUBLICATIONS

Machine translation of JP-2002218683-A. (Year: 2002).*

*Primary Examiner* — Michael Andrews
(74) *Attorney, Agent, or Firm* — Oliff PLC

(57) ABSTRACT

A rotating electric machine includes an armature and a field rotor. The field rotor includes magnetic pole teeth, an annular body portion, a bypass gap portion and permanent magnets. The magnetic pole teeth are arranged so that the polarities thereof alternate between N and S in a circumferential direction of the field rotor. The annular body portion connects the magnetic pole teeth at their root portions. The bypass gap portion is provided on an opposite side of the annular body portion to the magnetic pole teeth. The permanent magnets are provided in the annular body portion so as to be spaced from one another in the circumferential direction. The bypass gap portion includes first magnetic gaps each of which is formed adjacent to one of the permanent magnets. Each of the permanent magnets is arranged within an inter-pole angular range between one circumferentially-adjacent pair of the magnetic pole teeth.

10 Claims, 11 Drawing Sheets

(51) Int. Cl.
*H02K 1/14* (2006.01)
*H02K 3/18* (2006.01)
*H02K 21/04* (2006.01)

(52) U.S. Cl.
CPC ......... *H02K 1/2746* (2013.01); *H02K 1/2773* (2013.01); *H02K 3/18* (2013.01); *H02K 1/246* (2013.01); *H02K 21/046* (2013.01); *H02K 2201/12* (2013.01); *H02K 2213/09* (2013.01)

(58) Field of Classification Search
CPC .... H02K 3/18; H02K 21/046; H02K 2201/12; H02K 2213/09
USPC ........................................ 310/156.48, 156.55
See application file for complete search history.

(56) References Cited

U.S. PATENT DOCUMENTS

| | | | |
|---|---|---|---|
| 2006/0097594 A1* | 5/2006 | Abou-Akar | H02K 1/2773 310/156.01 |
| 2014/0091664 A1 | 4/2014 | Aoyama | |
| 2015/0137648 A1 | 5/2015 | Kato et al. | |
| 2015/0171678 A1 | 6/2015 | Tsutsui et al. | |
| 2015/0229171 A1* | 8/2015 | Pan | H02K 1/2773 310/156.56 |
| 2017/0126082 A1 | 5/2017 | Kusase | |

FOREIGN PATENT DOCUMENTS

| JP | 2014-072995 A | 4/2014 |
|---|---|---|
| WO | 2014/033863 A1 | 3/2014 |

\* cited by examiner

ROTATING ELECTRIC MACHINE WITH MAGNETIC GAPS

CROSS-REFERENCE TO RELATED APPLICATION

This application is based on and claims priority from Japanese Patent Application No. 2016-18025 filed on Feb. 2, 2016, the content of which is hereby incorporated by reference in its entirety into this application.

BACKGROUND

1 Technical Field

The present invention relates to rotating electric machines which include an armature and a field rotor (i.e., a rotor functioning as a field).

2 Description of Related Art

To achieve a small size, high performance, long service life and high reliability, permanent magnet motors, particularly IPM (Interior Permanent Magnet) motors with permanent magnets embedded in a rotor have been widely used. The IPM motors can greatly change, by changing the amplitude or phase of armature current, not only torque but also the amount of field magnetic flux passing through the armature. Therefore, IPM motors have advantages such that it is possible to control a counterelectromotive force and cause them to exert high torque during, for example, high-speed rotation.

Japanese Patent Application Publication No. JP2015526052A discloses a variable magnetomotive force rotating electric machine that is designed to obtain stable torque without employing expensive high-coercivity magnets and without performing a field-weakening control in a high-speed region. Specifically, the variable magnetomotive force rotating electric machine includes a rotor that has magnetic gap portions each being formed between a permanent magnet arranged in a d-axis magnetic path of one pole and an adjacent permanent magnet of a different polarity. With the magnetic gap portions, there are also formed, in the rotor, d-axis bypasses via which d-axis magnetic flux passes through an area other than the permanent magnets. Moreover, with the d-axis bypasses, the magnetic reluctance in a d-axis direction becomes lower than the magnetic reluctance in a q-axis direction.

However, in the prior art rotating electric machines including the variable magnetomotive force rotating electric machine disclosed in the above patent document, it is required for permanent magnets to be capable of withstanding demagnetization and be supplied with high magnetic flux. Therefore, it is needed to employ permanent magnets having high coercivity and high magnetic flux density. As a result, the manufacturing cost is increased.

Moreover, with the employment of permanent magnets having high magnetic flux density, when antiphase current for weakening the field is supplied to the armature coil (or stator coil) and thus the flux linkage of the armature coil is reduced, an amount of magnetic flux corresponding to the reduction in the flux linkage is leaked to other areas (e.g., to the d-axis bypasses disclosed in the above patent document). Consequently, there still exists magnetic flux passing through the armature core (or stator core). That is, though the voltage is lowered, the amount of magnetic flux passing through the armature core is not reduced. As a result, there still remains the problem that the iron loss is large during, for example, high-speed rotation.

SUMMARY

According to exemplary embodiments, there is provided a rotating electric machine which includes an armature and a field rotor. The armature includes an armature core and a multi-phase coil. The armature core has a plurality of slots formed therein. The multi-phase coil is wound on the armature core so as to be received in the slots of the armature core. The field rotor is rotatably disposed so as to radially face the armature. The field rotor includes a plurality of magnetic pole teeth, an annular body portion, a bypass gap portion and a plurality of permanent magnets. The magnetic pole teeth are spaced from one another in a circumferential direction of the field rotor so that polarities of the magnetic pole teeth alternate between N and S in the circumferential direction. The annular body portion connects the magnetic pole teeth at their root portions. The bypass gap portion is provided on an opposite side of the annular body portion to the magnetic pole teeth. The permanent magnets are provided in the annular body portion so as to be spaced from one another in the circumferential direction of the field rotor. The permanent magnets are magnetized in a predetermined direction. The bypass gap portion includes a plurality of first magnetic gaps each of which is formed adjacent to one of the permanent magnets. Each of the permanent magnets is arranged within an inter-pole angular range between one circumferentially-adjacent pair of the magnetic pole teeth.

With the above configuration, the permanent magnets are arranged away from the armature with the magnetic pole teeth located between the armature and the permanent magnets. Therefore, it is difficult for the permanent magnets to be demagnetized. Consequently, it becomes possible to realize a field structure and control which are resistant to demagnetization. Moreover, with the first magnetic gaps formed in the bypass gap portion, it is possible to suppress waste of magnet magnetic flux due to a constant short circuit. Furthermore, by setting a width of the first magnetic gaps to be less than a width of the permanent magnets, it is possible to have the magnet magnetic flux circulating via the bypass gap portion when armature current is reduced or supplied in the opposite direction (i.e., in the direction of weakening the magnet magnetic flux). That is, it is possible to have the magnet magnetic flux confined within the field rotor without flowing to the armature core. Consequently, it is possible to prevent the coil magnetic flux and the magnet magnetic flux from being canceled by each other, thereby preventing a decrease in the total magnetic flux generated in the rotating electric machine.

Preferably, either or both of the permanent magnets and the first magnetic gaps are arranged in a radial pattern in the field rotor.

In a further implementation, first and second magnetic circuits are formed in the rotating electric machine. Via the first magnetic circuit, magnetic flux flows through the armature core, the magnetic pole teeth, the annular body portion and one of the permanent magnets. Via the second magnetic circuit, magnetic flux flows through the armature core, the magnetic pole teeth, the annular body portion and the bypass gap portion.

The field rotor may further include a plurality of magnetic conductors. Each of the magnetic conductors is radially interposed between the armature and the annular body portion and arranged within the inter-pole angular range between one circumferentially-adjacent pair of the magnetic pole teeth. In the rotating electric machine, there may be further formed, in addition to the first and second magnetic circuits, a third magnetic circuit via which magnetic flux flows through the armature core and one of the magnetic conductors.

It is preferable that: (1) Ld>Lq, where Ld is a d-axis inductance and Lq is a q-axis inductance, the d-axis inductance being an inductance along a d-axis that is defined to radially extend through a center of one of the magnetic pole teeth, the q-axis inductance being an inductance along a q-axis that is defined to radially extend through a boundary position between the magnetic pole tooth and another one of the magnetic pole teeth which is circumferentially adjacent to the magnetic pole tooth; and (2) the rotating electric machine is configured to function as an electric motor when β<0°, where β is a phase angle of magnetomotive force of magnetic poles that are created in the armature core upon energization of the multi-phase coil, the phase angle taking a positive value in a rotational direction of the field rotor with the q-axis being a reference position.

It is preferable that Pd<Pg, where Pd is a permeance of the annular body portion and Pg is a permeance of the bypass gap portion.

It is also preferable that X=2 mp, where X is the number of the slots formed in the armature core, m is the number of phases of the multi-phase coil, and p is the number of magnetic poles that are created in the armature core upon energization of the multi-phase coil.

The rotating electric machine may further include a rotating shaft that is configured to rotate together with the field rotor. The bypass gap portion may have a plurality of directly-fixed parts each of which is directly fixed to the rotating shaft and a plurality of indirectly-fixed parts each of which is indirectly fixed to the rotating shaft with a second magnetic gap formed between the indirectly-fixed part and the rotating shaft.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
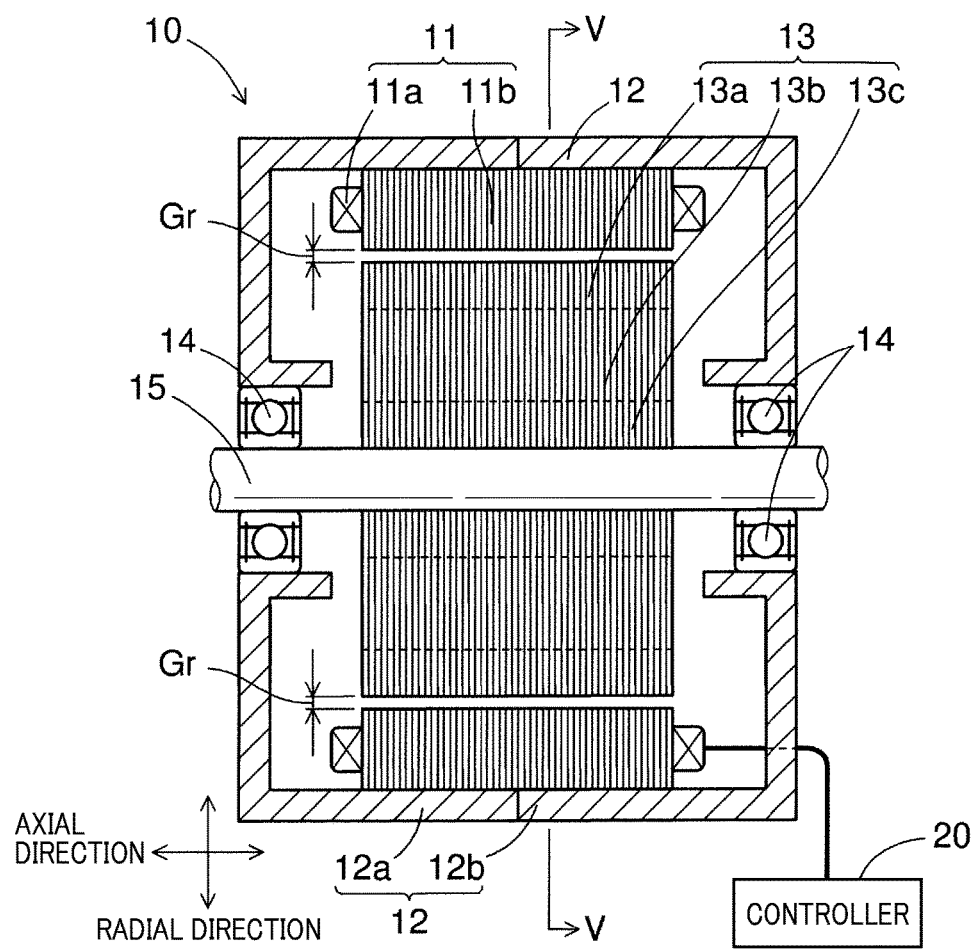
FIG. 1 is a schematic cross-sectional view of a rotating electric machine according to a first embodiment.

Exemplary embodiments will be described hereinafter with reference to FIGS. 1-16. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

[First Embodiment]

FIG. 1 shows the overall configuration of a rotating electric machine 10 according to the first embodiment.

In the present embodiment, the rotating electric machine 10 is configured as a motor-generator for use in a motor vehicle; the motor-generator selectively functions either as an electric motor or as an electric generator.

As shown in FIG. 1, the rotating electric machine 10 includes an armature (or stator) 11, a field rotor (i.e., a rotor functioning as a field) 13, a pair of bearings 14 and a rotating shaft 15, all of which are received in a frame (or housing) 12. Moreover, the rotating electric machine 10 also includes a controller 20 which may be provided either outside or inside the frame 12. For example, in the present embodiment, the controller 20 is provided outside the frame 12.

The frame 12 may be formed of any suitable material into any suitable shape. The frame 12 supports and fixes thereto, at least, the armature 11. Moreover, the frame 12 rotatably supports the rotating shaft 15 via the pair of bearings 14.

For example, in the present embodiment, the frame 12 is formed of a nonmagnetic material and includes a pair of cup-shaped frame pieces 12a and 12b which are fixed together at the open ends thereof In addition, the frame pieces 12a and 12b may be fixed together by fixing members (e.g., bolts, nuts or fixing pins) or by welding. It should be appreciated that the frame 12 may also be formed into a single piece.

The armature 11 includes a multi-phase coil (or armature coil) 11a and an annular armature core 11b on which the multi-phase coil 11a is wound.

Figure 5:
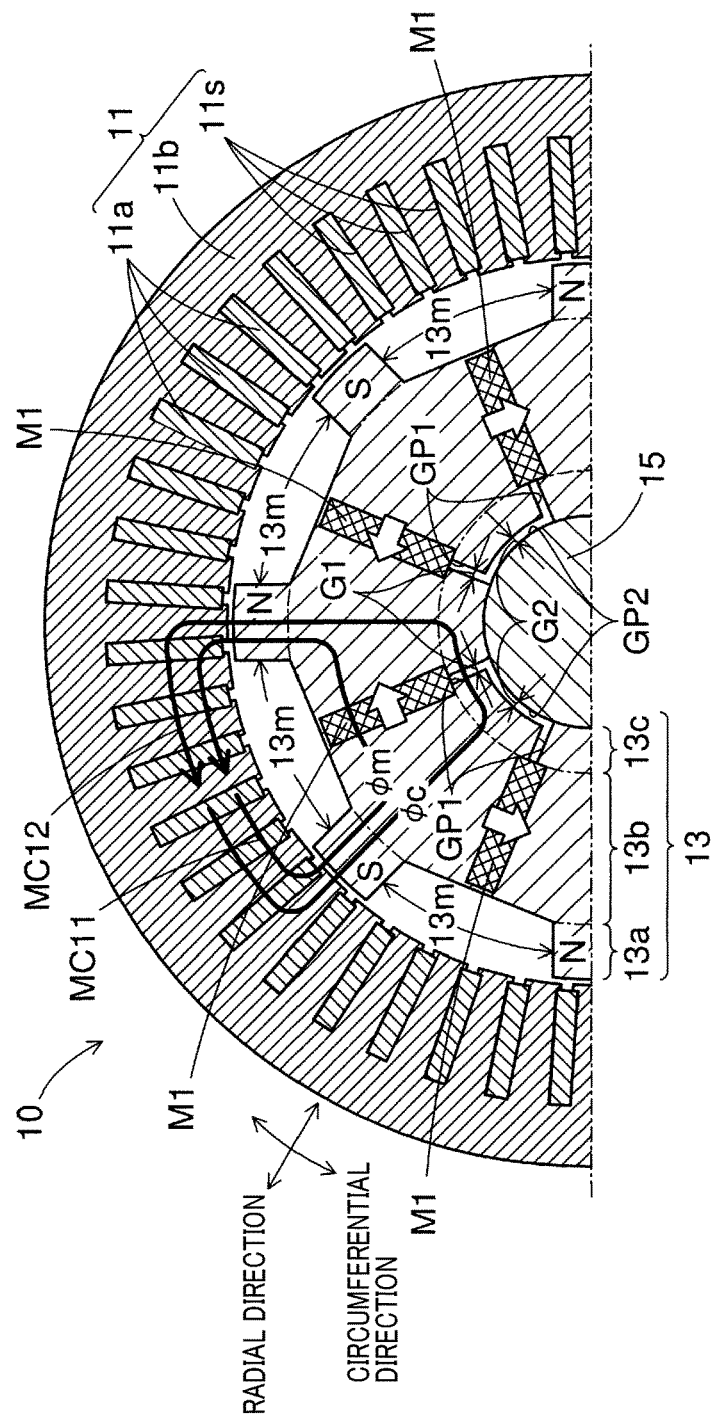
FIG. 5 is a cross-sectional view of an upper half of the rotating electric machine taken along the line V-V in FIG. 1.

As shown in FIG. 5, the armature core 11b has a plurality of slots 11s formed therein. The slots 11s are spaced from one another at a predetermined pitch in a circumferential direction of the armature core 11b. Each of the slots 11s extends in an axial direction of the armature core 11b so as to penetrate the armature core 11b in the axial direction. Moreover, each of the slots 11s opens on a radially inner surface of the armature core 11b.

The armature core 11b is formed of a soft-magnetic material. More specifically, in the present embodiment, the armature core 11b is formed by laminating a plurality of annular magnetic steel sheets in the axial direction thereof.

In the present embodiment, the multi-phase coil 11a is configured as a three-phase coil. The multi-phase coil 11a may be formed of either a single continuous conductor wire or a plurality of conductor wires (or conductor segments) that are electrically connected with each other. Moreover, the multi-phase coil 11a may have any suitable cross-sectional shape, such as a rectangular cross-sectional shape, a circular cross-sectional shape or a triangular cross-sectional shape.

The multi-phase coil 11a is wound on the armature core 11b so as to be received in the slots 11s. In addition, the multi-phase coil 11a may be wound in any suitable manner, such as full-pitch winding, short-pitch winding, concentrated winding or distributed winding.

For example, though not shown in the figures, in the present embodiment, the multi-phase coil 11a has a rectangular cross-sectional shape and is received in four layers in each of the slots 11s. Moreover, the multi-phase coil 11a extends across a predetermined number of the slots 11s over an angular range corresponding to one magnetic pole pitch PT; in the course of the extension, there is formed a crank-shaped part by which the multi-phase coil 11a is radially offset.

The number of the slots 11s formed in the armature core 11b can be set by the following equation: X=2 mp, where X is the number of the slots 11s, m is a positive integer representing the number of phases of the multi-phase coil 11a, and p is a positive integer representing the number of magnetic poles created in the armature core 11b upon energization of the multi-phase coil 11a. For example, in the present embodiment, m=3 and p=8; therefore, X=2×3× 8=48.

Moreover, one magnetic pole pitch PT can be determined by the following equation: PT=360°/p, where 360° is the mechanical angle of one revolution. For example, in the present embodiment, p=8; therefore, PT=360°/8=45°.

The field rotor 13 is disposed radially inside the armature core 11b so as to face a radially inner periphery of the armature core 11b. The field rotor 13 is fixed on the rotating shaft 15 so as to rotate together with the rotating shaft 15. In the present embodiment, the field rotor 13 is formed by laminating a plurality of magnetic steel sheets in an axial direction of the field rotor 13. Between the field rotor 13 and the armature core 11b, there is provided a radial gap Gr (see FIG. 1). The size of the radial gap Gr may be set to any suitable value to the extent that magnetic flux can flow between the field rotor 13 and the armature 11.

Figure 2:
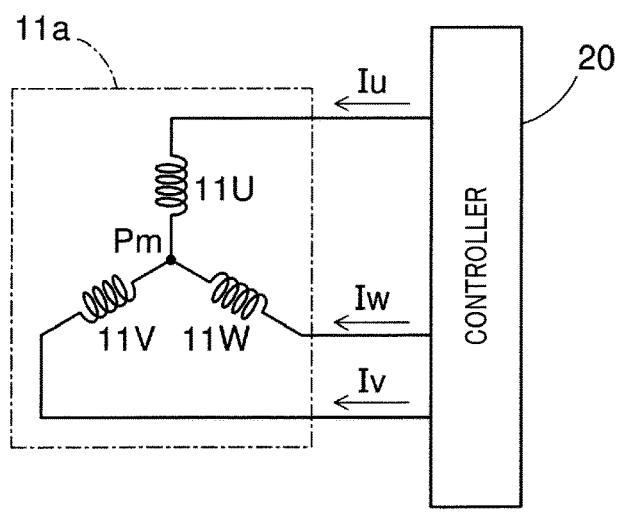
FIG. 2 is a schematic connection diagram illustrating the electrical connection between a controller and a multi-phase coil of the rotating electric machine.

As shown in FIG. 2, in the present embodiment, the multi-phase coil 11a is configured as a three-phase coil which includes a U-phase winding 11U, a V-phase winding 11V and a W-phase winding 11W. The U-phase, V-phase and W-phase windings 11U, 11V and 11W are Y-connected to define a neutral point Pm therebetween. In addition, the neutral point Pm may be formed by connecting corresponding ends of the U-phase, V-phase and W-phase windings 11U, 11V and 11W either directly or via an intermediate tap.

The controller 20 controls operation of the rotating electric machine 10. Specifically, when the rotating electric machine 10 functions as an electric motor (e.g., during power running), the controller 20 controls three-phase alternating current supplied to the multi-phase coil 11a (or armature current I). Otherwise, when the rotating electric machine 10 functions as an electric generator (e.g., during regenerative braking), the controller 20 controls the use of electromotive force generated in the multi-phase coil 11a (e.g., charging a battery or feeding an electrical load).

In the present embodiment, as the three-phase alternating current supplied to the multi-phase coil 11a, the controller 20 controls U-phase alternating current Iu supplied to the U-phase winding 11U, V-phase alternating current Iv supplied to the V-phase winding 11V and W-phase alternating current Iw supplied to the W-phase winding 11W. According to the directions of supplying the U-phase, V-phase and W-phase currents Iu, Iv and Iw, the direction of magnetic flux generated in the armature core 11b changes as shown in FIG. 5 (see first and second magnetic circuits MC11 and MC12) and FIG. 8 (see magnetic circuit MC1a and MC1b).

Figure 3:
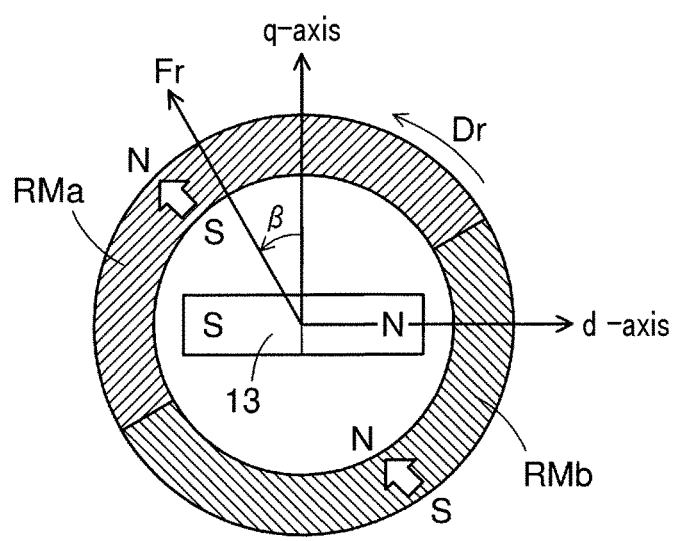
FIG. 3 is a schematic view illustrating a phase angle controlled by the controller.

FIG. 3 illustrates a two-pole model that models the relationship between a rotating magnetic field, which is created in the armature core 11b upon supply of the three-phase alternating current to the multi-phase coil 11a, and magnetic pole teeth 13a (see FIG. 5) of the field rotor 13.

In FIG. 3, RMa and RMb designate magnetic poles of the rotating magnetic field created in the armature core 11b. The rotating magnetic poles RMa and RMb are respectively magnetized into polarities (i.e., N and S poles) as indicated by blanked arrows in FIG. 3. Moreover, the rotating magnetic poles RMa and RMb rotate in, for example, a rotational direction Dr indicated by a curved-line arrow in FIG. 3. The rotating magnetomotive force of the rotating magnetic poles RMa and RMb corresponds to an "armature magnetomotive force" and is designated as a vector by Fr in FIG. 3. In addition, a d-axis (pole center) and a q-axis (pole boundary) of one magnetic pole tooth 13a of the field rotor 13 are also indicated by arrows in FIG. 3.

A "phase angle" β is an electrical angle between the rotating magnetomotive force Fr and the magnetic pole teeth 13a of the field rotor 13. In FIG. 3, the phase angle β is represented by an angle between the boundary (or intermediate) position between one pair of the magnetic pole teeth 13a (i.e., the q-axis) and the rotating magnetomotive force Fr; the phase angle β takes a positive value in the rotational direction Dr with the boundary position being a reference position. In other words, the phase angle β is equal to 0° when the direction of the rotating magnetomotive force Fr coincides with the q-axis.

In addition, though FIG. 3 illustrates an example where the rotational direction Dr coincides with the counterclockwise direction, the following explanation can also be applied to an example where the rotational direction Dr coincides with the clockwise direction. Therefore, no example where the rotational direction Dr coincides with the clockwise direction is shown in the figures. Moreover, when the rotational direction Dr coincides with the clockwise direction, the phase angle β takes a positive value in the clockwise direction. Furthermore, though FIG. 3 illustrates a two-pole model, the following explanation can also be applied to models of four or more poles.

The torque F generated by each magnetic pole tooth 13a is equal to the quotient of the torque T, which is generated by all the magnetic pole teeth 13a, divided by the number P of the magnetic poles.

Figure 4:
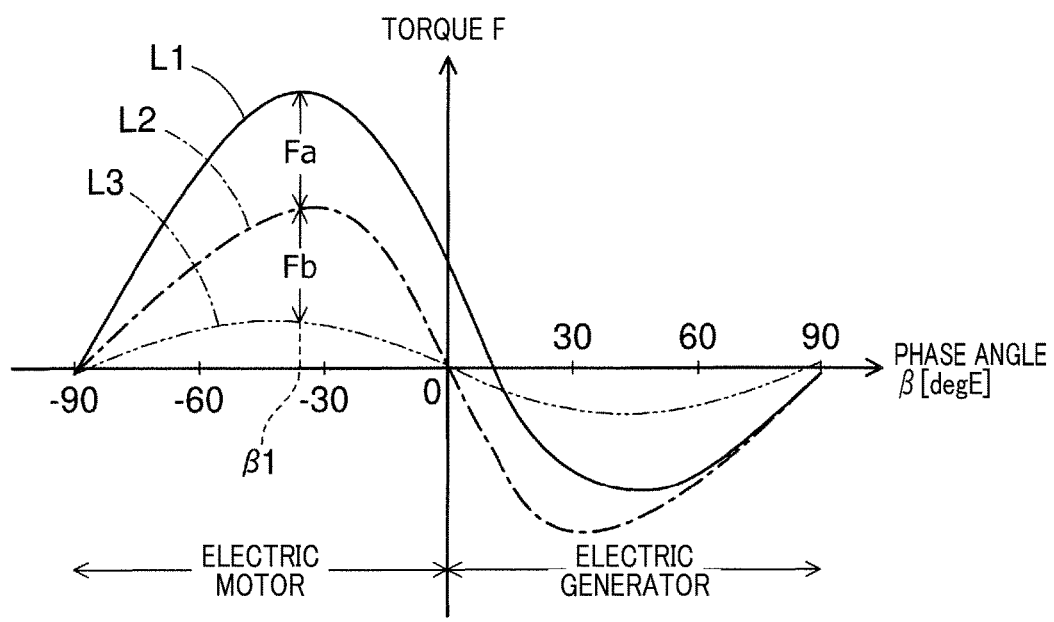
FIG. 4 is a graphical representation illustrating the relationship between the phase angle and torque of the rotating electric machine.

FIG. 4 shows the relationship between the above-described phase angle β and torque F. More specifically, in FIG. 4, a characteristic line L1, which is drawn as a continuous line, represents the relationship between the phase angle β and the torque F of the rotating electric machine 10 according to the present embodiment. A characteristic line L2, which is drawn as a one-dot chain line, represents the relationship between the phase angle β and the torque F of the rotating electric machine 10 from which permanent magnets M1 are removed. A characteristic line L3, which is drawn as a two-dot chain line, represents the relationship between the phase angle β and the reluctance torque component of the torque F of the rotating electric machine 10 from which the permanent magnets M1 are removed. In addition, [degE] in FIG. 4 denotes "degrees in electrical angle".

As shown in FIG. 4, at a value β1 of the phase angle β, there are a torque difference Fa between the characteristic lines L1 and L2 and a torque difference Fb between the characteristic lines L2 and L3. The torque difference Fa is caused by magnet magnetic flux ϕm which flows through the permanent magnet M1 included in the first magnetic circuit MC11 of the rotating electric machine 10 (see FIG. 5); in other words, the torque difference Fa is caused by magnet torque (i.e., torque produced by the permanent magnet M1). The torque difference Fb is caused by coil magnetic flux ϕc which flows through a bypass gap portion 13c of the field rotor 13 included in the second magnetic circuit MC12 of the rotating electric machine 10 (see FIG. 5); in other words, the torque difference Fb is caused by reluctance torque. Therefore, the characteristic line L1 is a characteristic line which is obtained by synthesizing the characteristic lines L2 and L3. In addition, both the magnet magnetic flux ϕm and the coil magnetic flux ϕc are included in the magnetic flux ϕ generated in the rotating electric machine 10.

In the present embodiment, the controller 20 controls the phase angle β according to the operating mode of the rotating electric machine 10. More specifically, as shown in FIG. 4, when the phase angle β is controlled by the controller 20 so as to be in the range of −90°<β<0°, the rotating electric machine 10 functions as an electric motor. In contrast, when the phase angle β is controlled by the controller 20 so as to be in the range of 0°<β<90°, the rotating electric machine 10 functions as an electric generator.

As shown in FIG. 5, in the present embodiment, the field rotor 13 includes the aforementioned magnetic pole teeth 13a, an annular body portion 13b, the aforementioned bypass gap portion 13c and the aforementioned permanent magnets M1, but no field winding.

The field rotor 13 may be formed of any suitable soft-magnetic material. In the present embodiment, the field rotor 13 is formed by laminating a plurality of magnetic steel sheets in the axial direction thereof. In addition, the permeance Pd of the annular body portion 13b and the permeance Pg of the bypass gap portion 13c are set to satisfy the relationship of Pd<Pg.

Each of the magnetic pole teeth 13a protrudes from the annular body portion 13b radially outward (i.e., toward the armature core 11b). The magnetic pole teeth 13a are arranged at a predetermined pitch in a circumferential direction of the field rotor 13 (or the circumferential direction of the annular body portion 13b) so that the polarities of the magnetic pole teeth 13a alternate between N (North) and S (South) in the circumferential direction.

The annular body portion 13b connects the magnetic pole teeth 13a at their root portions. In the annular body portion 13b, there are provided the permanent magnets M1 that are magnetized in a predetermined direction, more particularly in the circumferential direction of the field rotor 13 in the present embodiment as indicated by blanked arrows in FIG. 5. Each of the permanent magnets M1 is arranged within an inter-pole angular range 13m between one circumferentially-adjacent pair of the magnetic pole teeth 13a. In addition, the polarities of the magnetic pole teeth 13a alternate between N and S in the circumferential direction of the field rotor 13 according to the orientation of polarities of the permanent magnets M1.

The bypass gap portion 13c is formed radially inside the annular body portion 13b. That is, the bypass gap portion 13c is located on the opposite side of the annular body portion 13b to the magnetic pole teeth 13a. The bypass gap portion 13c has a plurality of first magnetic gaps GP1 and a plurality of second magnetic gaps GP2 formed therein. Each of the first magnetic gaps GP1 is formed immediately adjacent to one of the permanent magnets M1 and extends radially inward from the adjacent permanent magnet M1. Each of the first magnetic gaps GP1 constitutes a magnetic reluctance and is implemented by an air gap in the present embodiment. The circumferential width G1 of the first magnetic gaps GP1 may be set to any suitable value to the extent that the coil magnetic flux ϕc can flow circumferentially across the first magnetic gaps GP1. On the other hand, each of the second magnetic gaps GP2 is formed between a radially inner surface of the bypass gap portion 13c and the rotating shaft 15. Moreover, each of the second magnetic gaps GP2 circumferentially extends between one circumferentially-adjacent pair of the first magnetic gaps GP1 and is circumferentially located so as to radially overlap one of the S-polarity magnetic pole teeth 13a. Each of the second magnetic gaps GP2 also constitutes a magnetic reluctance and is implemented by an air gap in the present embodiment. The radial width G2 of the second magnetic gaps GP2 may be set to any suitable value to the extent that G2>G1.

In the present embodiment, the permanent magnets M1 and the first magnetic gaps GP1 are arranged in a radial pattern within the respective inter-pole angular ranges 13m between the circumferentially-adjacent magnetic pole teeth 13a. That is, each adjacent pair of one of the permanent magnets M1 and one of the first magnetic gaps GP1 is arranged, within the inter-pole angular range 13m between one circumferentially-adjacent pair of the magnetic pole teeth 13a, so as to be longer in the radial direction than in the circumferential direction of the field rotor 13. With the above arrangement, it is possible to simplify both the shape of the annular body portion 13b having the permanent magnets M1 provided therein and the shape of the bypass gap portion 13c having the first magnetic gaps GP1 formed therein. Consequently, it is possible to realize a simple structure of the field rotor 13.

In the rotating electric machine 10 according to the present embodiment, there are formed a first magnetic circuit MC11 and a second magnetic circuit MC12 as shown with bold lines in FIG. 5. The first magnetic circuit MC11 is formed by the armature core 11b, the magnetic pole teeth 13a, the annular body portion 13b and one of the permanent magnets M1; thus, via the first magnetic circuit MC11, the magnet magnetic flux ϕm flows through the armature core 11b, the magnetic pole teeth 13a, the annular body portion 13b and the permanent magnet M1. On the other hand, the second magnetic circuit MC12 is formed by the armature core 11b, the magnetic pole teeth 13a, the annular body portion 13b and the bypass gap portion 13c; thus, via the second magnetic circuit MC12, the coil magnetic flux $\phi c$ flows through the armature core 11b, the magnetic pole teeth 13a, the annular body portion 13b and the bypass gap portion 13c.

The first and second magnetic circuits MC11 and MC12 constitute magnetic flux paths that are parallel and selectively easy to pass through with respect to the permanent magnet M1. The magnet magnetic flux $\phi m$ flowing in the first magnetic circuit MC11 contributes to the magnet torque, while the coil magnetic flux $\phi c$ flowing in the second magnetic circuit MC12 contributes to the reluctance torque.

As shown in FIG. 5, in the present embodiment, the bypass gap portion 13c is configured to have a plurality of directly-fixed parts each of which is directly fixed to the rotating shaft 15 and a plurality of indirectly-fixed parts each of which is indirectly fixed to the rotating shaft 15 with one of the second magnetic gaps GP2 formed between the indirectly-fixed part and the rotating shaft 15. With the above configuration, it is possible to block the magnetic flux $\phi$ (more specifically, the coil magnetic flux $\phi c$) from leaking from the bypass gap portion 13c to the rotating shaft 15.

Figure 6:
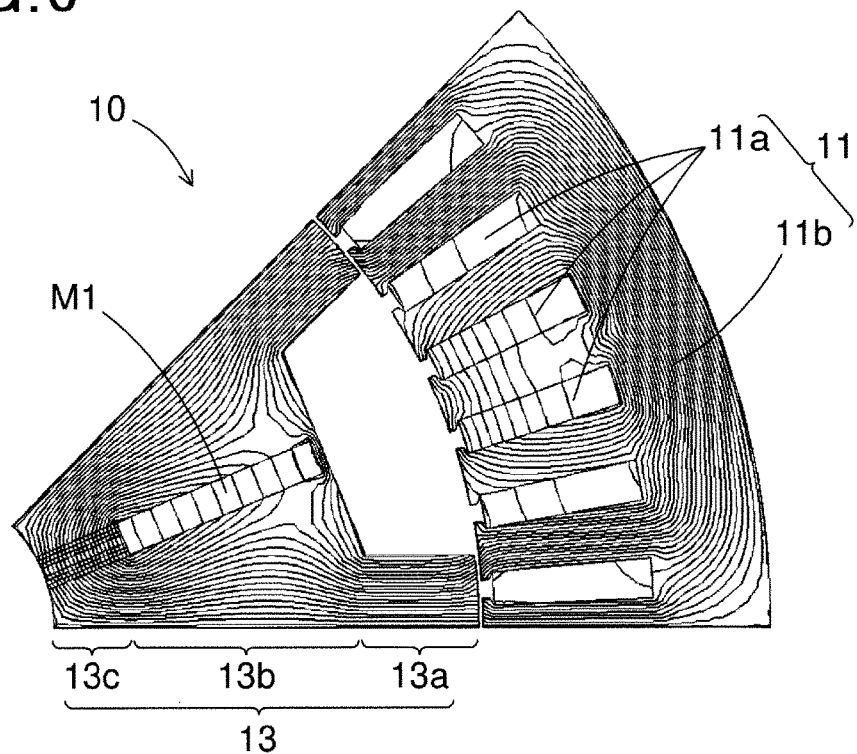
FIG. 6 is a schematic view illustrating the flow of magnetic flux in the rotating electric machine according to the first embodiment when armature current is supplied in a direction of intensifying magnet magnetic flux.
Figure 7:
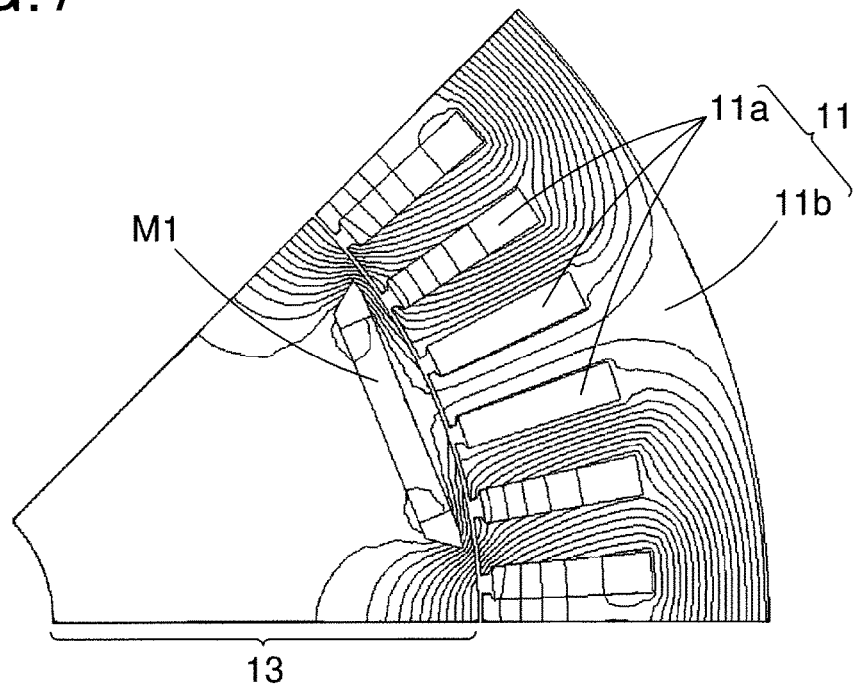
FIG. 7 is a schematic view illustrating the flow of magnetic flux in a conventional rotating electric machine when armature current is supplied in a direction of intensifying magnet magnetic flux.

FIG. 6 shows, in the form of contour lines, the flow of the magnetic flux $\phi$ in the rotating electric machine 10 according to the present embodiment when the armature current I (i.e., the three-phase alternating current supplied to the multi-phase coil 11a) is supplied in a direction of intensifying the magnet magnetic flux $\phi m$. FIG. 7 shows, in the form of contour lines, the flow of the magnetic flux $\phi$ in a conventional rotating electric machine when the armature current I is supplied in a direction of intensifying the magnet magnetic flux $\phi m$. The conventional rotating electric machine has the permanent magnets M1 arranged in the vicinity of a radially outer periphery of the field rotor 13, similar to the variable magnetomotive force rotating electric machine disclosed in the paten document described in the "Description of Related Art" section. In addition, the direction of intensifying the magnet magnetic flux $\phi m$ is a direction such that the coil magnetic flux $\phi c$, which is generated by the supply of the armature current I to the multi-phase coil 11a, flows in the same direction as the magnet magnetic flux $\phi m$ generated by the permanent magnets M1, as shown in FIG. 5.

As can be seen from FIG. 6, in the rotating electric machine 10 according to the present embodiment, the magnetic flux $\phi$ flows uniformly in the armature 11 and the field rotor 13. The coil magnetic flux $\phi c$ flows in a direction of strengthening the permanent magnets M1 as well as flows to the bypass gap portion 13c. Therefore, it is difficult for the permanent magnets M1 to be demagnetized. Consequently, it is possible to minimize the size of the permanent magnets M1 with the same magnetic force (or the same amount of magnetic flux); otherwise, it is possible to employ the permanent magnets M1 having a lower magnetic force with the same size.

In comparison, as can be seen from FIG. 7, in the conventional rotating electric machine, there exists a region where no magnetic flux $\phi$ flows. The existence of such a region evidences (or indicates) occurrence of demagnetization of the permanent magnets M1. Specifically, demagnetization of the permanent magnets M1 occurs on the opposite side of the permanent magnets M1 to the armature 11, i.e., occurs in a rotating shaft 15-side region. To compensate for the demagnetization of the permanent magnets M1, it is necessary to increase the size of the permanent magnets M1 with the same magnetic force (or the same amount of magnetic flux); otherwise, it is necessary to employ the permanent magnets M1 having a higher magnetic force with the same size.

Figure 8:
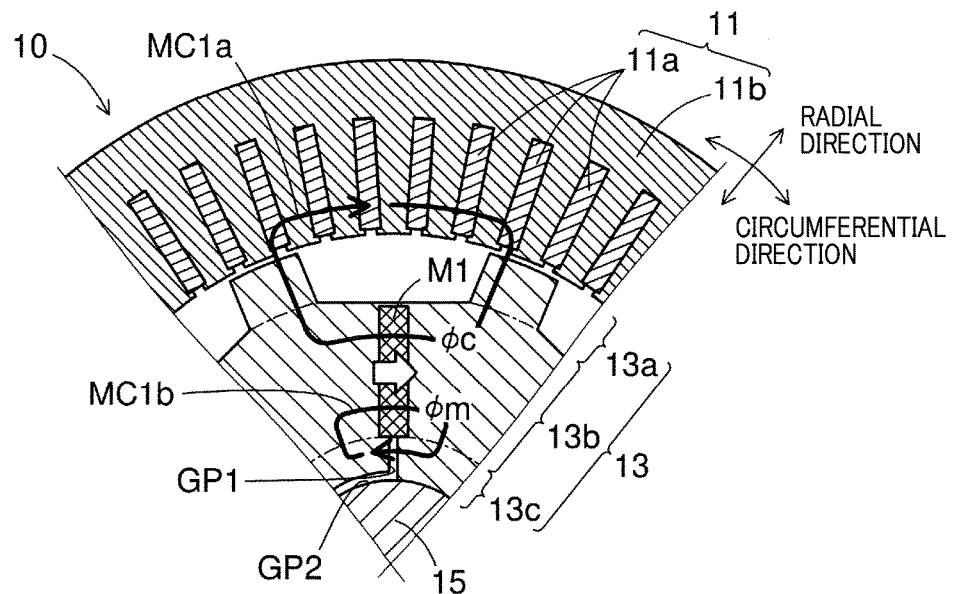
FIG. 8 is a schematic view illustrating magnetic circuits formed in the rotating electric machine according to the first embodiment when armature current is supplied in a direction of weakening magnet magnetic flux.

FIG. 8 illustrates the flow of the magnetic flux $\phi$ in the rotating electric machine 10 according to the present embodiment when the armature current I is supplied in a direction of weakening the magnet magnetic flux $\phi m$. In addition, the direction of weakening the magnet magnetic flux $\phi m$ is a direction such that the coil magnetic flux $\phi c$, which is generated by the supply of the armature current I to the multi-phase coil 11a, flows in an opposite direction to the magnet magnetic flux $\phi m$ generated by the permanent magnets M1.

As shown in FIG. 8, when the armature current I is supplied in the direction of weakening the magnet magnetic flux $\phi m$, the coil magnetic flux $\phi c$ flows in the magnetic circuit MC1a which is formed by the armature core 11b, the magnetic pole teeth 13a, the annular body portion 13b and one of the permanent magnets M1. In other words, via the magnetic circuit MC1a, the coil magnetic flux $\phi c$ flows through the armature core 11b, the magnetic pole teeth 13a, the annular body portion 13b and the permanent magnet M1. In addition, the magnetic circuit MC1a is identical to the first magnetic circuit MC11 shown in FIG. 5 except that the flow direction of the coil magnetic flux $\phi c$ in the magnetic circuit MC1a is opposite to the flow direction of the magnet magnetic flux $\phi m$ in the first magnetic circuit MC11. On the other hand, the magnet magnetic flux $\phi m$ flows in the magnetic circuit MC1b which is formed by the annular body portion 13b, the bypass gap portion 13c and one of the permanent magnets M1. In other words, via the magnetic circuit MC1b, the magnet magnetic flux $\phi m$ flows through the annular body portion 13b, the bypass gap portion 13c and the permanent magnet M1, but not through the armature core 11b and the magnetic pole teeth 13a. That is, the magnet magnetic flux $\phi m$ is confined within the field rotor 13 without flowing to the armature core 11b. Consequently, it becomes possible to prevent the coil magnetic flux $\phi c$ and the magnet magnetic flux $\phi m$ from being canceled by each other, thereby preventing a decrease in the total magnetic flux $\phi$ generated in the rotating electric machine 10.

Figure 9:
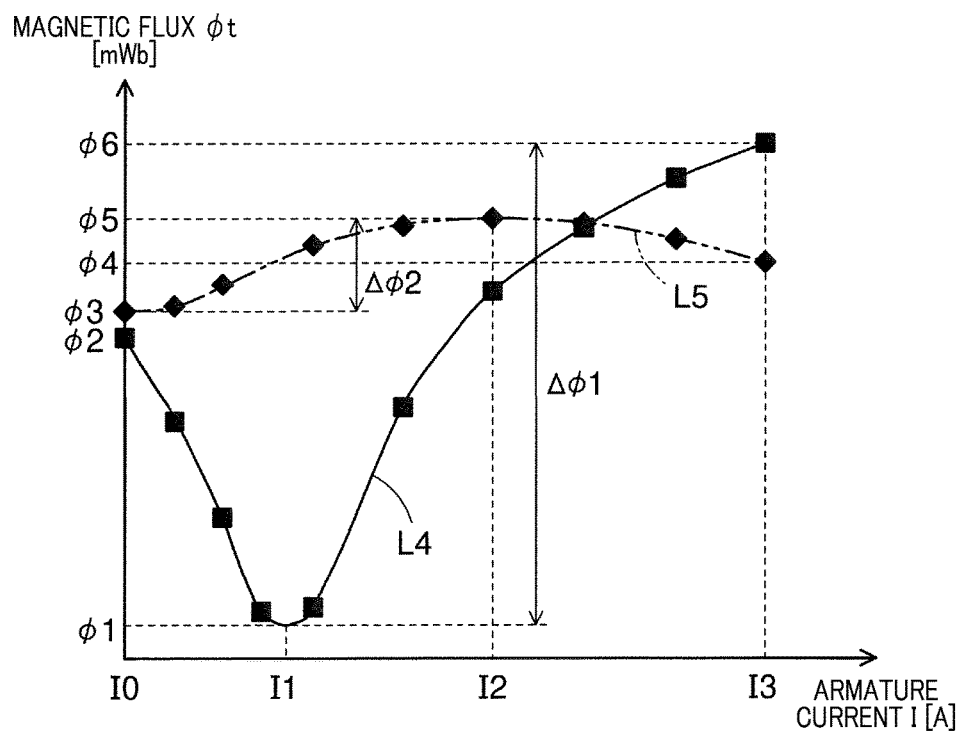
FIG. 9 is a graphical representation illustrating the relationship between armature current and magnetic flux passing through each of magnetic pole teeth of a field rotor in the rotating electric machine according to the first embodiment and in the conventional rotating electric machine.

FIG. 9 shows the relationship between the armature current I and the magnetic flux $\phi t$ passing through each of the magnetic pole teeth 13a when the armature current I is supplied in the direction of weakening the magnet magnetic flux $\phi m$ with the phase angle $\beta$ shown in FIG. 3 being equal to 90°.

In FIG. 9, a characteristic line L4, which is drawn as a continuous line, represents the relationship between the armature current I and the magnetic flux $\phi t$ in the rotating electric machine 10 according to the present embodiment. A characteristic line L5, which is drawn as a two-dot chain line, represents the relationship between the armature current I and the magnetic flux $\phi t$ in the conventional rotating electric machine.

As can be seen from FIG. 9, in the rotating electric machine 10 according to the present embodiment, the magnetic flux $\phi t$ is equal to $\phi 2$ when the armature current I is equal to I0, equal to a minimum value of $\phi 1$ when the armature current I is equal to I1, and equal to a maximum value of $\phi 6$ when the armature current I is equal to I3. In addition, I0<I1<I3; and $\phi 1<\phi 2<\phi 6$.

On the other hand, in the conventional rotating electric machine, the magnetic flux $\phi$ is equal to a minimum value of $\phi 3$ when the armature current I is equal to I0, equal to a maximum value of $\phi5$ when the armature current I is equal to I2, and equal to $\phi4$ when the armature current I is equal to I3. In addition, I0<I2<I3; and $\phi3<\phi4<\phi5$.

Moreover, as can also be seen from FIG. 9, $\Delta\phi1$ is considerably greater than $\Delta\phi2$. Here, $\Delta\phi1$ represents the difference between $\phi6$ and $\phi1$, while $\Delta\phi2$ represents the difference between $\phi5$ and $\phi3$. That is, in the conventional rotating electric machine, it is possible to reduce the flux linkage of the multi-phase coil 11a and thereby lower the induced voltage in the multi-phase coil 11a; however, the magnetic flux passing through the armature core 11b is not weakened. In comparison, in the rotating electric machine 10 according to the present embodiment, the magnet magnetic flux $\phi$m is confined within the field rotor 13 as shown in FIG. 8. Therefore, when the armature current I is supplied in the direction of weakening the magnet magnetic flux $\phi$m, the magnet magnetic flux $\phi$m is prevented from flowing to the armature 11; thus, it becomes possible to prevent the coil magnetic flux $\phi$c and the magnet magnetic flux $\phi$m from being canceled by each other. As a result, it becomes possible to suppress the iron loss of the armature 11 even when the rotating electric machine 10 operates at high frequency and high rotational speed.

Figure 10:
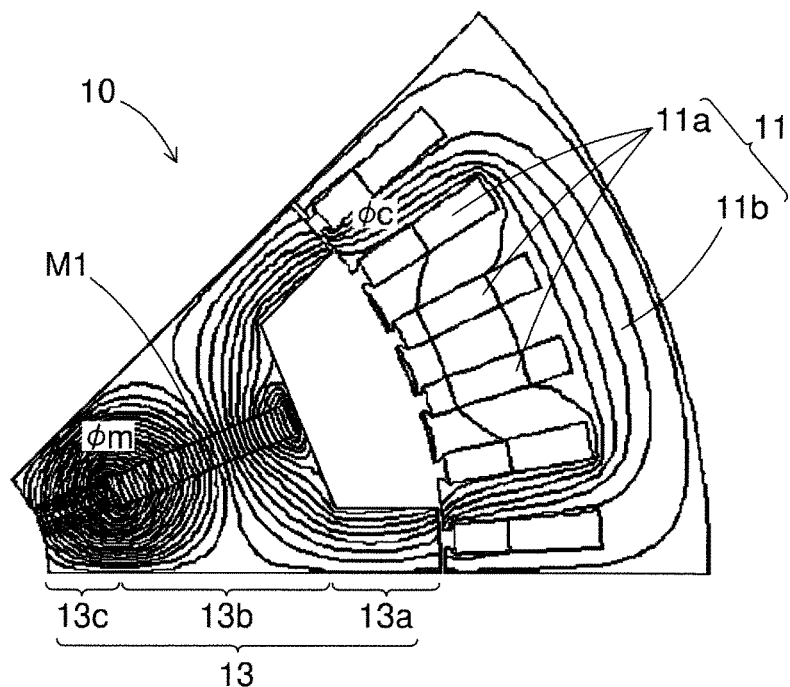
FIG. 10 is a schematic view illustrating the flow of magnetic flux in the rotating electric machine according to the first embodiment when armature current is supplied in a direction of weakening magnet magnetic flux.
Figure 11:
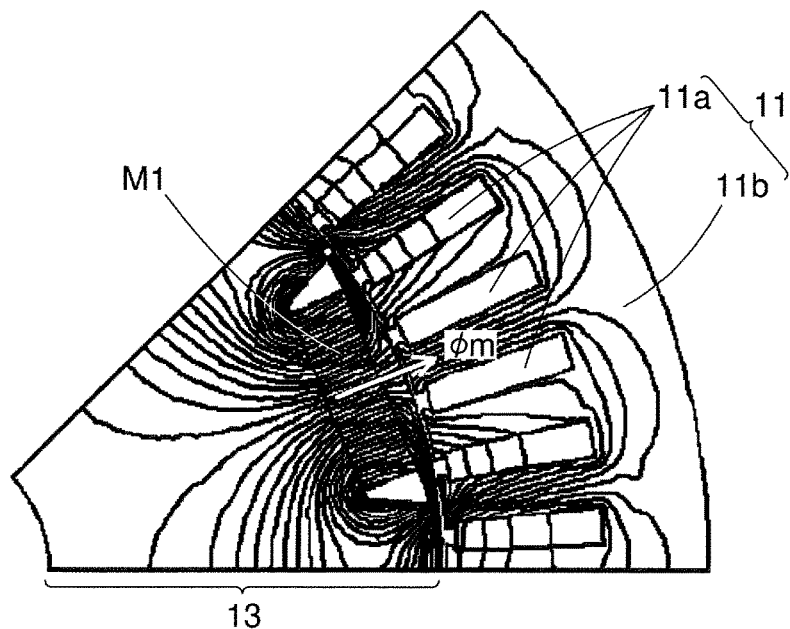
FIG. 11 is a schematic view illustrating the flow of magnetic flux in the conventional rotating electric machine when armature current is supplied in a direction of weakening magnet magnetic flux.

FIG. 10 shows, in the form of contour lines, the flow of the magnetic flux $\phi$ in the rotating electric machine 10 according to the present embodiment when the armature current I is supplied in the direction of weakening the magnet magnetic flux $\phi$m. FIG. 11 shows, in the form of contour lines, the flow of the magnetic flux $\phi$ in the conventional rotating electric machine when the armature current I is supplied in the direction of weakening the magnet magnetic flux $\phi$m.

As can be seen from FIG. 10, the magnetic flux $\phi$ generated in the rotating electric machine 10 according to the present embodiment is divided into the coil magnetic flux $\phi$c passing through the armature 11 and the magnet magnetic flux $\phi$m confined within the field rotor 13. Since the magnet magnetic flux $\phi$m does not flow to the armature 11, the coil magnetic flux $\phi$c and the magnet magnetic flux $\phi$m are prevented from being canceled by each other.

In comparison, in the conventional rotating electric machine, the magnet magnetic flux $\phi$m flows to the armature 11, as indicated by a blanked arrow in FIG. 11. Consequently, the coil magnetic flux $\phi$c and the magnet magnetic flux $\phi$m are canceled by each other, resulting in a decrease in the total magnetic flux $\phi$ generated in the conventional rotating electric machine.

Accordingly, in the rotating electric machine 10 according to the present embodiment, it is possible to reliably cause the coil magnetic flux $\phi$c to flow via the second magnetic circuit MC12 (see FIG. 5) when the armature current I is supplied in the direction of intensifying the magnet magnetic flux $\phi$m and via the magnetic circuit MC1a (see FIG. 8) when the armature current I is supplied in the direction of weakening the magnet magnetic flux $\phi$m. Consequently, it is possible to reliably obtain the reluctance torque in both the cases.

According to the present embodiment, it is possible to achieve the following advantageous effects.

In the present embodiment, the rotating electric machine 10 includes the armature 11 and the field rotor 13 (see FIGS. 1 and 5). The armature 11 includes the armature core 11b and the multi-phase coil 11a. The armature core 11b has the slots 11s formed therein. The multi-phase coil 11a is wound on the armature core 11b so as to be received in the slots 11s of the armature core 11b. The field rotor 13 is rotatably disposed so as to radially face the armature 11. The field rotor 13 includes the magnetic pole teeth 13a, the annular body portion 13b, the bypass gap portion 13c and the permanent magnets M1. The magnetic pole teeth 13a are spaced from one another in the circumferential direction of the field rotor 13 so that the polarities of the magnetic pole teeth 13a alternate between N and S in the circumferential direction. The annular body portion 13b connects the magnetic pole teeth 13a at their root portions. The bypass gap portion 13c is provided on the opposite side of the annular body portion 13b to the magnetic pole teeth 13a. The permanent magnets M1 are provided in the annular body portion 13b so as to be spaced from one another in the circumferential direction of the field rotor 13. The permanent magnets M1 are magnetized in a predetermined direction, more particularly in the circumferential direction of the field rotor 13 in the present embodiment. The bypass gap portion 13c includes the first magnetic gaps GP1 each of which is formed immediately adjacent to one of the permanent magnets M1. Each the permanent magnets M1 is arranged within the inter-pole angular range 13m between one circumferentially-adjacent pair of the magnetic pole teeth 13a.

With the above configuration, the permanent magnets M1 are arranged away from the armature 11 with the magnetic pole teeth 13a located between the armature 11 and the permanent magnets M1. Therefore, it is difficult for the permanent magnets M1 to be demagnetized. Consequently, it becomes possible to realize a field structure and control which are resistant to demagnetization. Moreover, with the first magnetic gaps GP1 formed in the bypass gap portion 13c, it is possible to suppress waste of the magnet magnetic flux $\phi$m due to a constant short circuit. Furthermore, by setting the circumferential width G1 of the first magnetic gaps GP1 to be less than the circumferential width of the permanent magnets M1, it is possible to have the magnet magnetic flux $\phi$m circulating via the bypass gap portion 13c when the armature current I is reduced or supplied in the opposite direction (i.e., in the direction of weakening the magnet magnetic flux $\phi$m). That is, it is possible to have the magnet magnetic flux $\phi$m confined within the field rotor 13 without flowing to the armature core 11b. Consequently, it is possible to prevent the coil magnetic flux $\phi$c and the magnet magnetic flux $\phi$m from being canceled by each other, thereby preventing a decrease in the total magnetic flux $\phi$ generated in the rotating electric machine 10.

In the present embodiment, both the permanent magnets M1 and the first magnetic gaps GP1 are arranged in the radial pattern in the field rotor 13 (see FIG. 5).

With the above arrangement, it is possible to simplify the structure of the field rotor 13, thereby reducing the manufacturing cost of the rotating electric machine 10.

In the present embodiment, there are both the first and second magnetic circuits MC11 and MC12 formed in the rotating electric machine 10 (see FIG. 5). Via the first magnetic circuit MC11, the magnet magnetic flux $\phi$m flows through the armature core 11b, the magnetic pole teeth 13a, the annular body portion 13b and one of the permanent magnets M1. Via the second magnetic circuit MC12, the coil magnetic flux $\phi$c flows through the armature core 11b, the magnetic pole teeth 13a, the annular body portion 13b and the bypass gap portion 13c.

With the above configuration, the first and second magnetic circuits MC11 and MC12 constitute magnetic flux paths that are parallel and selectively easy to pass through with respect to the permanent magnet M1. The coil magnetic flux $\phi$c generated in the armature core 11b upon energization of the multi-phase coil 11a is variable, whereas the magnet magnetic flux $\phi$m generated by the permanent magnet M1 is constant. Therefore, it is possible to selectively cause the coil magnetic flux φc and the magnet magnetic flux φm either to flow in the same direction and thus be intensified by each other or to flow respectively in opposite directions and thus be weakened by each other. Consequently, it becomes possible to realize a variable field without employing a field winding. Moreover, since no field winding is employed, it also becomes possible to minimize the size of the rotating electric machine 10.

In the present embodiment, the d-axis inductance Ld and the q-axis inductance Lq are set to satisfy the relationship of Ld>Lq. The d-axis inductance Ld is an inductance along the d-axis that is defined to radially extend through the center of one of the magnetic pole teeth 13a, while the q-axis inductance Lq is an inductance along the q-axis that is defined to radially extend through the boundary position between the magnetic pole tooth 13a and another one of the magnetic pole teeth 13a which is circumferentially adjacent to the magnetic pole tooth 13a. The rotating electric machine 10 is configured to function as an electric motor when β<0°, where β is the phase angle of the magnetomotive force Fr of the magnetic poles RMa and RMb that are created in the armature core 11b upon energization of the multi-phase coil 11a. The phase angle β takes a positive value in the rotational direction Dr of the field rotor 13 with the q-axis being the reference position (see FIGS. 3-4).

With the above configuration, the armature current I is supplied in the direction of strengthening the permanent magnets M1. Therefore, it is difficult for the permanent magnets M1 to be demagnetized. Moreover, upon the supply of the armature current I to the multi-phase coil 11a, the coil magnetic flux φc is generated at the armature core 11b and flows through the bypass gap portion 13c. Consequently, with both the magnet magnetic flux φm generated by the permanent magnets M1 and the coil magnetic flux φc, it is possible to increase the output torque of the rotating electric machine 10.

In the present embodiment, the permeance Pd of the annular body portion 13b and the permeance Pg of the bypass gap portion 13c are set to satisfy the relationship of Pd<Pg.

Setting Pd and Pg as above, it becomes selectively easier for the coil magnetic flux φc to flow through the bypass yoke portion 13c than through the permanent magnets M1. Consequently, the total magnetic flux φ is increased; and the variable magnetic flux is also increased.

In the present embodiment, the number X of the slots 11s formed in the armature core 11b is set by the following equation: X=2 mp, where m is the number of phases of the multi-phase coil 11a, and p is the number of the magnetic poles that are created in the armature core 11b upon energization of the multi-phase coil 11a.

Setting X as above, it is possible to distribute each of the U-phase, V-phase and W-phase windings 11U, 11V and 11W of the multi-phase coil 11a in the slots 11s of the armature core 11b. Consequently, though the field rotor 13 has the plurality of magnetic pole teeth 13a, it is still possible to suppress torque ripple in the rotating electric machine 10.

In the present embodiment, the bypass gap portion 13c has the directly-fixed parts each of which is directly fixed to the rotating shaft 15 and the indirectly-fixed parts each of which is indirectly fixed to the rotating shaft 15 with one of the second magnetic gaps G2 formed between the indirectly-fixed part and the rotating shaft 15 (see FIG. 5).

With the above configuration, though the rotating shaft 15 is formed of a magnetic material, it is still possible to block the magnetic flux φ (more specifically, the coil magnetic flux φc) from leaking from the bypass gap portion 13c to the rotating shaft 15. Consequently, it is possible to increase the output torque of the rotating electric machine 10.

[Second Embodiment]

This embodiment illustrates a rotating electric machine 10 which has almost the same configuration as the rotating electric machine 10 according to the first embodiment. Accordingly, only the differences therebetween will be described hereinafter.

Figure 12:
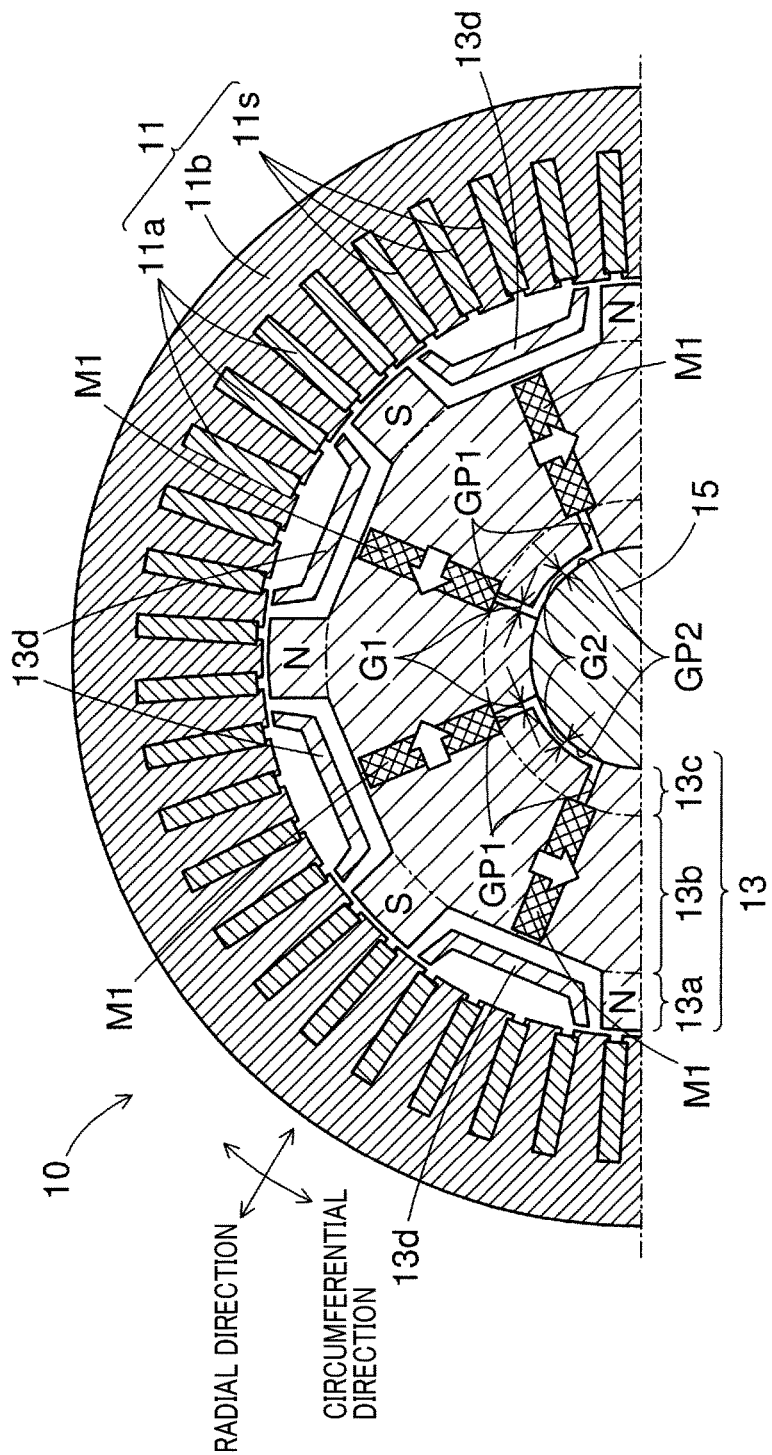
FIG. 12 is a cross-sectional view of an upper half of a rotating electric machine according to a second embodiment.

As shown in FIG. 12, in the present embodiment, the field rotor 13 further includes a plurality of magnetic conductors 13d, in comparison with the field rotor 13 in the first embodiment (see FIG. 5).

Each of the magnetic conductors 13d is radially interposed between the armature 11 and the annular body portion 13b and circumferentially interposed between one adjacent pair of the magnetic pole teeth 13a. In other words, each of the magnetic conductors 13d is arranged within the inter-pole angular range 13m between one circumferentially-adjacent pair of the magnetic pole teeth 13a.

Figure 13:
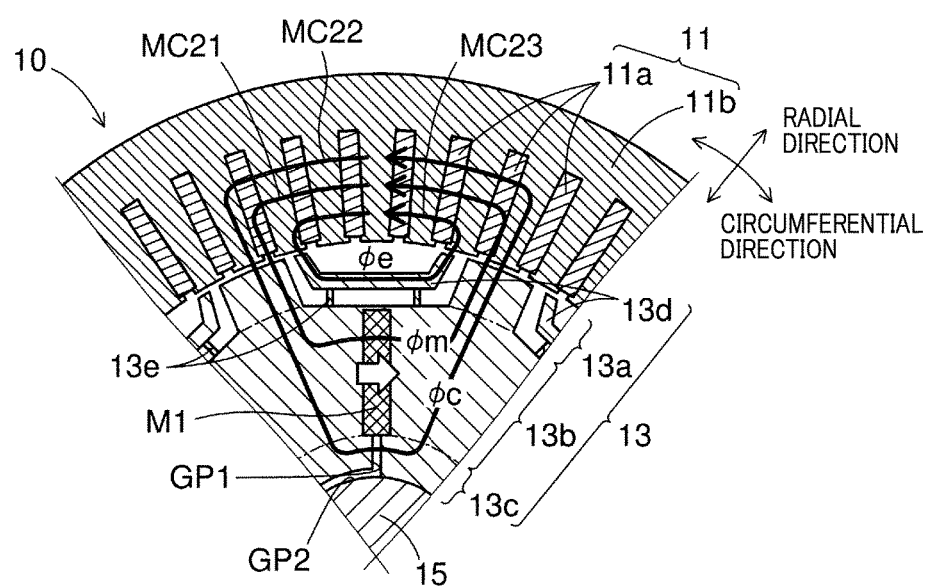
FIG. 13 is a schematic view illustrating magnetic circuits formed in the rotating electric machine according to the second embodiment when armature current is supplied in a direction of intensifying magnet magnetic flux.

The magnetic conductors 13d may be fixed in any suitable way. For example, as shown in FIG. 13, the magnetic conductors 13d may be fixed to the annular body portion 13b via supporting members 13e. Alternatively, though not shown in the figures, the magnetic conductors 13d may be fixed to the magnetic pole teeth 13a via supporting members 13e. The supporting members 13e may be formed of either a non-magnetic material or a soft-magnetic material which allows only a negligibly small amount of magnetic flux to flow therethrough.

In the present embodiment, the magnetic conductors 13d are formed of a soft-magnetic material that has a higher permeance than the magnetic pole teeth 13a, the annular body portion 13b and the bypass gap portion 13c. That is, the following relationship is satisfied: Pd<Pg<Pe, where Pd is the permeance of the annular body portion 13b, Pg is the permeance of the bypass gap portion 13c, and Pe is the permeance of the magnetic conductors 13d.

FIG. 13 illustrates the flow of the magnetic flux φ in the rotating electric machine 10 according to the present embodiment when the armature current I is supplied in the direction of intensifying the magnet magnetic flux φm.

In the rotating electric machine 10 according to the present embodiment, there are formed a first magnetic circuit MC21, a second magnetic circuit MC22 and a third magnetic circuit MC23 as shown with bold lines in FIG. 13. The first magnetic circuit MC21 is formed by the armature core 11b, the magnetic pole teeth 13a, the annular body portion 13b and one of the permanent magnets M1; thus, via the first magnetic circuit MC21, the magnet magnetic flux φm flows through the armature core 11b, the magnetic pole teeth 13a, the annular body portion 13b and the permanent magnet M1. The second magnetic circuit MC22 is formed by the armature core 11b, the magnetic pole teeth 13a, the annular body portion 13b and the bypass gap portion 13c; thus, via the second magnetic circuit MC22, the coil magnetic flux φc flows through the armature core 11b, the magnetic pole teeth 13a, the annular body portion 13b and the bypass gap portion 13c. In addition, the first and second magnetic circuits MC21 and MC22 are respectively identical to the first and second magnetic circuits MC11 and MC12 in the first embodiment (see FIG. 5). On the other hand, the third magnetic circuit MC23 is formed by the armature core 11b and one of the magnetic conductors 13d; thus, via the third magnetic circuit MC23, conductor magnetic flux φe flows through the armature core 11b and the magnetic conductor 13d. The first, second and third magnetic circuits MC21, MC22 and MC23 constitute magnetic flux paths that are parallel and selectively easy to pass through with respect to the permanent magnet M1. The magnet magnetic flux φm flowing in the first magnetic circuit MC21 contributes to the magnet torque, while both the coil magnetic flux φc flowing in the second magnetic circuit MC22 and the conductor magnetic flux φe flowing in the third magnetic circuit MC23 contribute to the reluctance torque.

According to the present embodiment, it is possible to achieve the same advantageous effects as described in the first embodiment.

Moreover, in the present embodiment, the field rotor 13 includes the magnetic conductors 13d each of which is radially interposed between the armature 11 and the annular body portion 13b and arranged within the inter-pole angular range 13m between one circumferentially-adjacent pair of the magnetic pole teeth 13a. In the rotating electric machine 10, there is further formed, in addition to the first and second magnetic circuits M21 and M22, the third magnetic circuit M23 via which the conductor magnetic flux φe flows through the armature core 11b and one of the magnetic conductors 13d.

With the above configuration, the third magnetic circuit MC23 constitutes a magnetic flux path which has a higher permeance than the magnetic flux paths constituted of the first and second magnetic circuits MC21 and MC22. Consequently, the total d-axis inductance Ld is increased, thereby increasing the output torque of the rotating electric machine 10.

[Third Embodiment]

This embodiment illustrates a rotating electric machine 10 which has a similar configuration to the rotating electric machine 10 according to the first embodiment. Accordingly, only the differences therebetween will be described hereinafter.

In the first embodiment, both the permanent magnets M1 and the first magnetic gaps GP1 are arranged in the radial pattern in the field rotor 13, so as to be longer in the radial direction than in the circumferential direction of the field rotor 13. The permanent magnets M1 are magnetized in the circumferential direction of the field rotor 13. Each of the first magnetic gaps GP1 is formed immediately adjacent to one of the permanent magnets M1 and extends radially inward from the adjacent permanent magnet M1 (see FIG. 5).

Figure 14:
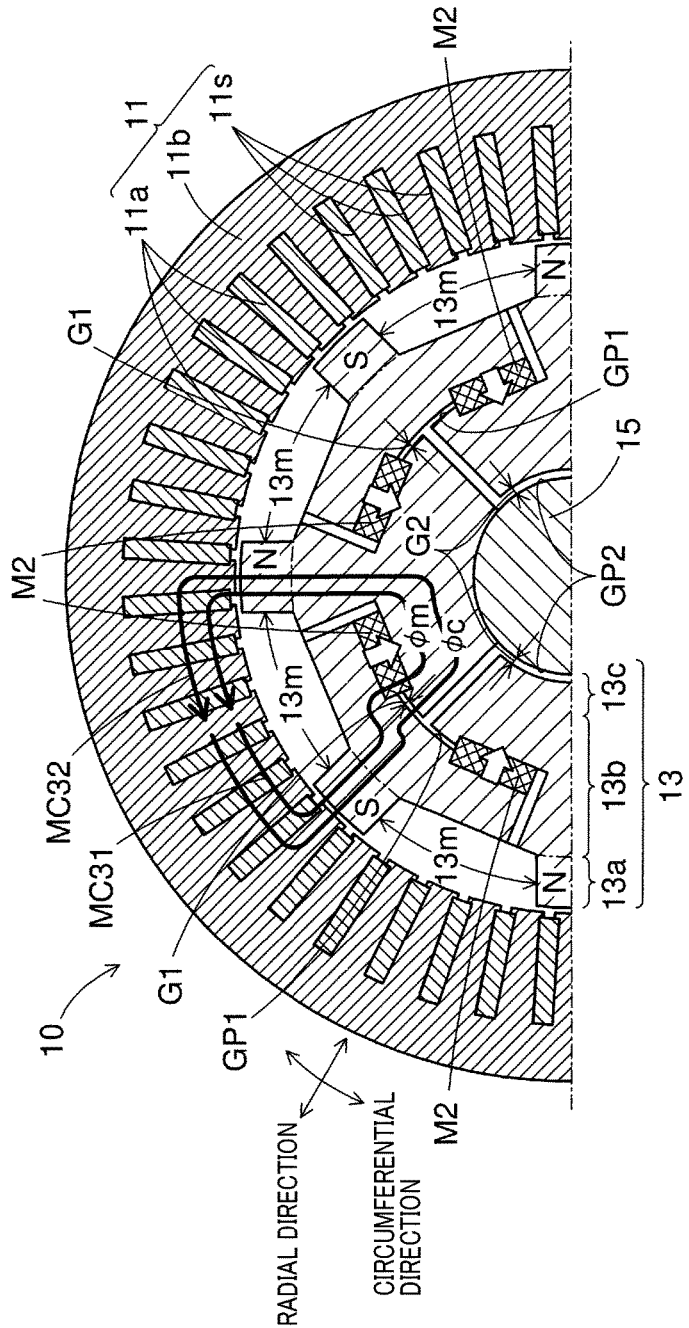
FIG. 14 is a cross-sectional view of an upper half of a rotating electric machine according to a third embodiment.

In comparison, in the present embodiment, as shown in FIG. 14, the field rotor 13 includes a plurality of permanent magnets M2 instead of the permanent magnets M1. Each of the permanent magnets M2 is arranged within the inter-pole angular range 13m between one circumferentially-adjacent pair of the magnetic pole teeth 13a. Each of the permanent magnets M2 is magnetized in a predetermined direction, more particularly in a radial direction of the field rotor 13 in the present embodiment as indicated by blanked arrows in FIG. 14. Moreover, the permanent magnets M2 are arranged in a non-radial pattern so as to be longer in the circumferential direction than in the radial direction of the field rotor 13.

In the present embodiment, each of the first magnetic gaps GP1 is interposed between one circumferentially-adjacent pair of the permanent magnets M2. Each of the first magnetic gaps GP1 is substantially T-shaped to include a circumferentially-extending part and a radially-extending part. The circumferentially-extending part extends in the circumferential direction of the field rotor 13 between one adjacent pair of the permanent magnets M2. The radial width G1 of the circumferentially-extending part may be set to any suitable value to the extent that the coil magnetic flux φc can flow radially across the circumferentially-extending part. The radially-extending part extends radially inward from the circumferentially-extending part.

In the rotating electric machine 10 according to the present embodiment, there are formed a first magnetic circuit MC31 and a second magnetic circuit MC32 as shown with bold lines in FIG. 14. The first magnetic circuit MC31 is formed by the armature core 11b, the magnetic pole teeth 13a, the annular body portion 13b and one of the permanent magnets M2; thus, via the first magnetic circuit MC31, the magnet magnetic flux φm flows through the armature core 11b, the magnetic pole teeth 13a, the annular body portion 13b and the permanent magnet M2. On the other hand, the second magnetic circuit MC32 is formed by the armature core 11b, the magnetic pole teeth 13a, the annular body portion 13b and the bypass gap portion 13c; thus, via the second magnetic circuit MC32, the coil magnetic flux φc flows through the armature core 11b, the magnetic pole teeth 13a, the annular body portion 13b and the bypass gap portion 13c. The first and second magnetic circuits MC31 and MC32 constitute magnetic flux paths that are parallel and selectively easy to pass through with respect to the permanent magnet M2. The magnet magnetic flux φm flowing in the first magnetic circuit MC31 contributes to the magnet torque, while the coil magnetic flux φc flowing in the second magnetic circuit MC32 contributes to the reluctance torque.

According to the present embodiment, it is possible to achieve almost the same advantageous effects as described in the first embodiment.

In addition, in the present embodiment, though the structure of the field rotor 13 is more complicated than that of the field rotor 13 in the first embodiment (see FIG. 5), it is possible to optimally arrange the permanent magnets M2 according to the type and design specification of the rotating electric machine 10.

[Other Embodiments]

While the above particular embodiments have been shown and described, it will be understood by those skilled in the art that the present invention can also be embodied in various other modes without departing from the spirit of the present invention.

For example, the field rotor 13 in the third embodiment (see FIG. 14) may be modified to further include a plurality of magnetic conductors 13d as described in the second embodiment (see FIG. 12). In this case, it is also possible to achieve the same advantageous effects as described in the second embodiment.

In the above described embodiments, in the field rotor 13, there are formed the second magnetic gaps GP2 as well as the first magnetic gaps GP1 (see FIGS. 5, 13 and 14).

Figure 15:
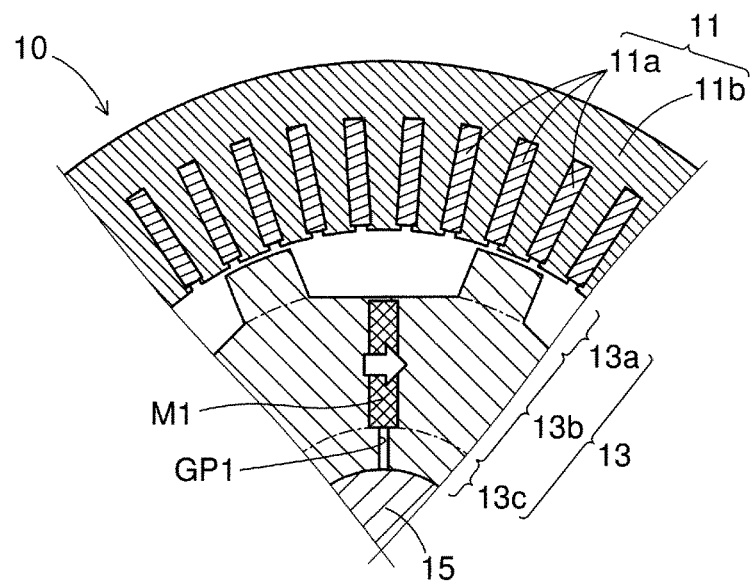
FIG. 15 is a cross-sectional view illustrating the configuration of a rotating electric machine according to one modification.

However, as shown in FIG. 15, the field rotor 13 may be modified to have only the first magnetic gaps GP1 formed therein, omitting the second magnetic gaps GP2 therefrom. In this case, it is necessary to form the rotating shaft 15 with a non-magnetic material. With the rotating shaft 15 formed of the non-magnetic material, it is possible to block the magnetic flux φ (more specifically, the coil magnetic flux φc) from leaking from the bypass gap portion 13c to the rotating shaft 15. Consequently, it is possible to achieve the same advantageous effects as described in the above described embodiments. In addition, without the second magnetic gaps GP2, the structure of the field rotor 13 is simplified, thereby lowering the manufacturing cost of the rotating shaft 10.

In the above described embodiments, all of the first magnetic gaps GP1 and the second magnetic gaps GP2 are formed as air gaps. Moreover, all of the gaps between circumferentially-adjacent magnetic pole teeth 13a are also formed as air gaps (see FIGS. 5, 13 and 14).

Figure 16:
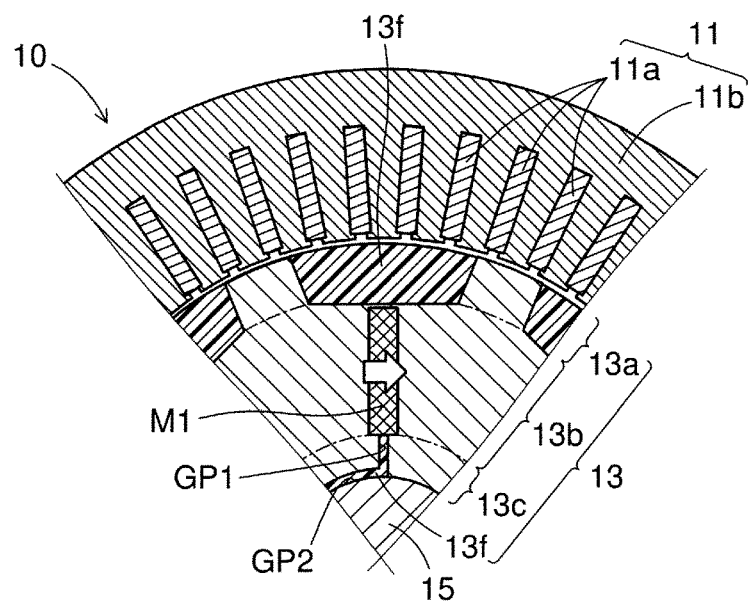
FIG. 16 is a cross-sectional view illustrating the configuration of a rotating electric machine according to another modification.

However, it is possible to fill at least one of the first magnetic gaps GP1, the second magnetic gaps GP2 and the gaps between circumferentially-adjacent magnetic pole teeth 13a with a filler 13f that is formed of a non-magnetic material. For example, as shown in FIG. 16, all of the first magnetic gaps GP1, the second magnetic gaps GP2 and the gaps between circumferentially-adjacent magnetic pole teeth 13a may be filled with the filler 13f. In this case, since no magnetic flux $\phi$ flows through the filler 13 that is formed of the non-magnetic material, it is possible to achieve the same advantageous effects as described in the above embodiments. In addition, with the filler 13, it is possible to improve the rigidity of the field rotor 13, thereby suppressing vibration of the field rotor 13 during rotation thereof.

In the above-described embodiments, the permanent magnets M1 or M2 have a rectangular cross-sectional shape (see FIGS. 5, 13 and 14). However, the permanent magnets M1 or M2 may be modified to have any other suitable cross-sectional shape, such as a triangular or pentagonal cross-sectional shape. In this case, it is still possible to achieve the same advantageous effects as described in the above-described embodiments. In addition, in terms of increasing the magnet torque, it is preferable for the permanent magnets M1 or M2 to have a cross-sectional shape adapted to the flow of the magnet magnetic flux $\phi$m.

In the above-described embodiments, each of the permanent magnets M1 or M2 is formed as a single piece (see FIGS. 5, 13 and 14). However, at least one of the permanent magnets M1 or M2 may alternatively be formed of a plurality of permanent magnet segments. In this case, it is still possible to achieve the same advantageous effects as described in the above-described embodiments.

In the first and second embodiments, each of the permanent magnets M1 is completely embedded in the annular body portion 13b (see FIGS. 5 and 13). However, at least one of the permanent magnets M1 may be partially embedded in the annular body portion 13b, with a portion thereof exposed from the annular body portion 13b and supported by a supporting member. In this case, it is still possible to achieve the same advantageous effects as described in the first and second embodiments.

In the above-described embodiments, the bypass gap portion 13c is formed separately from the rotating shaft 15 (see FIGS. 1, 5, 13 and 14). However, in the case where at least part of the rotating shaft 15 is formed of a soft-magnetic material, the bypass gap portion 13c may be implemented by a part of the rotating shaft 15 which is formed of the soft-magnetic material. In other words, the bypass gap portion 13c may be formed as an integral part of the rotating shaft 15. In this case, it is still possible to achieve the same advantageous effects as described in the above-described embodiments.

In the above-described embodiments, the multi-phase coil 11a is configured as a three-phase coil (see FIG. 2). However, the number of phases of the multi-phase coil 11a may be greater than 3. In this case, it is still possible to achieve the same advantageous effects as described in the above-described embodiments.

In the above-described embodiments, the U-phase, V-phase and W-phase windings 11U, 11V and 11W of the multi-phase coil 11a are connected together to form a Y-connection (see FIG. 2). However, the U-phase, V-phase and W-phase windings 11U, 11V and 11W of the multi-phase coil 11a may alternatively be connected together to form a Δ connection or a Y-Δ connection. In this case, it is still possible to achieve the same advantageous effects as described in the above-described embodiments.

In the above-described embodiments, the present invention is applied to the inner rotor rotating electric machine 10 where the field rotor 13 is rotatably disposed radially inside the armature 11 (see FIGS. 1, 5, 13 and 14). However, the present invention may also be applied to an outer rotor rotating electric machine where a field rotor is rotatably disposed radially outside an armature. In this case, it is still possible to achieve the same advantageous effects as described in the above-described embodiments.

What is claimed is:

1. A rotating electric machine comprising:
    an armature including an armature core and a multi-phase coil, the armature core having a plurality of slots formed therein, the multi-phase coil being wound on the armature core so as to be received in the slots of the armature core; and
    a field rotor rotatably disposed so as to radially face the armature,
    wherein
    the field rotor includes a plurality of magnetic pole teeth, an annular body portion, a bypass gap portion and a plurality of permanent magnets,
    the magnetic pole teeth are spaced from one another in a circumferential direction of the field rotor so that polarities of the magnetic pole teeth alternate between N and S in the circumferential direction,
    the annular body portion connects the magnetic pole teeth at their root portions,
    the bypass gap portion is provided on an opposite side of the annular body portion to the magnetic pole teeth,
    the permanent magnets are provided in the annular body portion so as to be spaced from one another in the circumferential direction of the field rotor, each of the permanent magnets being magnetized in a predetermined magnetization direction and having a width in the magnetization direction,
    the bypass gap portion includes a plurality of first magnetic gaps each of which is formed adjacent to one of the permanent magnets,
    each of the permanent magnets is arranged within an inter-pole angular range between one circumferentially-adjacent pair of the magnetic pole teeth, and
    each of the first magnetic gaps extends in a direction perpendicular to the magnetization direction of the permanent magnets and has a width in the magnetization direction that is smaller than the width of each of the permanent magnets in the magnetization direction.

2. The rotating electric machine as set forth in claim 1, wherein all of the permanent magnets and the first magnetic gaps radially extend so that each of the first magnetic gaps is in radial alignment with one of the permanent magnets.

3. The rotating electric machine as set forth in claim 1, wherein first and second magnetic circuits are formed in the rotating electric machine,
    via the first magnetic circuit, magnetic flux flows through the armature core, the magnetic pole teeth, the annular body portion and one of the permanent magnets, and
    via the second magnetic circuit, magnetic flux flows through the armature core, the magnetic pole teeth, the annular body portion and the bypass gap portion and across one of the first magnetic gaps.

4. The rotating electric machine as set forth in claim 3, wherein the field rotor further includes a plurality of magnetic conductors,
- each of the magnetic conductors is radially interposed between the armature and the annular body portion and arranged within the inter-pole angular range between one circumferentially-adjacent pair of the magnetic pole teeth, and
- in the rotating electric machine, there is further formed, in addition to the first and second magnetic circuits, a third magnetic circuit via which magnetic flux flows through the armature core and one of the magnetic conductors.

5. The rotating electric machine as set forth in claim 1, wherein Ld>Lq, where Ld is a d-axis inductance and Lq is a q-axis inductance, the d-axis inductance being an inductance along a d-axis that is defined to radially extend through a center of one of the magnetic pole teeth, the q-axis inductance being an inductance along a q-axis that is defined to radially extend through a boundary position between the magnetic pole tooth and another one of the magnetic pole teeth which is circumferentially adjacent to the magnetic pole tooth, and
- the rotating electric machine further comprises a controller that controls β to be less than 0° and thereby causes the rotating electric machine to function as an electric motor, where β is a phase angle of magnetomotive force of magnetic poles that are created in the armature core upon energization of the multi-phase coil, the phase angle taking a positive value in a rotational direction of the field rotor with the q-axis being a reference position.

6. The rotating electric machine as set forth in claim 1, wherein Pd<Pg, where Pd is a permeance of the annular body portion and Pg is a permeance of the bypass gap portion.

7. The rotating electric machine as set forth in claim 1, wherein X=2 mp, where X is the number of the slots formed in the armature core, m is the number of phases of the multi-phase coil, and p is the number of magnetic poles that are created in the armature core upon energization of the multi-phase coil.

8. The rotating electric machine as set forth in claim 1, further comprising a rotating shaft that is configured to rotate together with the field rotor, wherein the bypass gap portion has a plurality of directly-fixed parts each of which is directly fixed to the rotating shaft and a plurality of indirectly-fixed parts each of which is indirectly fixed to the rotating shaft with a second magnetic gap formed between the indirectly-fixed part and the rotating shaft.

9. The rotating electric machine as set forth in claim 1, wherein all of the permanent magnets and the first magnetic gaps are arranged in the circumferential direction of the field rotor to fall on a same imaginary circle.

10. The rotating electric machine as set forth in claim 1, wherein radially inner surfaces of the bypass gap portion extend radially inward of the permanent magnet and define second magnetic gaps between the radially inner surface of the bypass gap portion and a radially outer surface of a rotating shaft that is configured to rotate together with the field rotor.

* * * * *